(12) United States Patent
Jachner

(10) Patent No.: US 8,041,015 B2
(45) Date of Patent: Oct. 18, 2011

(54) PRESENCE BASED DTMF SIGNALING ENABLEMENT OF VOICE COMMUNICATION CONTROLLER AND METHOD

(75) Inventor: Jack Jachner, Lexington, MA (US)

(73) Assignee: Alcatel Lucent, Paris (FR)

( * ) Notice: Subject to any disclaimer, the term of this patent is extended or adjusted under 35 U.S.C. 154(b) by 1155 days.

(21) Appl. No.: 11/764,206

(22) Filed: Jun. 17, 2007

(65) Prior Publication Data

US 2008/0310607 A1 Dec. 18, 2008

(51) Int. Cl.
*H04M 11/06* (2006.01)
*H04L 12/66* (2006.01)

(52) U.S. Cl. ............... 379/93.21; 370/329; 370/352; 379/88.01; 379/201.01; 379/207.1; 379/219; 379/265.09; 709/227

(58) Field of Classification Search ........... 370/352, 370/329; 379/88.01, 93.21, 201.01, 207.11, 379/219, 265.09, 202.01, 207.1; 709/227
See application file for complete search history.

(56) References Cited

U.S. PATENT DOCUMENTS

| | | | |
|---|---|---|---|
| 5,369,697 A | 11/1994 | Murray et al. | |
| 7,466,810 B1 * | 12/2008 | Quon et al. | 379/201.01 |
| 7,742,584 B2 * | 6/2010 | Chatterjee et al. | 379/201.01 |
| 7,853,696 B2 * | 12/2010 | Caballero-McCann et al. | 709/227 |
| 2001/0053214 A1 | 12/2001 | Kleinoder et al. | |
| 2003/0215080 A1 * | 11/2003 | Wengrovitz | 379/219 |
| 2006/0245391 A1 * | 11/2006 | Vaidya et al. | 370/329 |
| 2007/0081644 A1 | 4/2007 | Jachner | |
| 2007/0115940 A1 * | 5/2007 | Kamen et al. | 370/352 |
| 2007/0117508 A1 | 5/2007 | Jachner | |
| 2007/0133437 A1 | 6/2007 | Wengrovitz | |
| 2007/0189487 A1 * | 8/2007 | Sharland et al. | 379/202.01 |
| 2007/0291924 A1 * | 12/2007 | Matula | 379/265.09 |
| 2008/0008163 A1 * | 1/2008 | Castell et al. | 370/352 |
| 2008/0310607 A1 * | 12/2008 | Jachner | 379/93.21 |
| 2009/0110170 A1 * | 4/2009 | Haley | 379/207.11 |

FOREIGN PATENT DOCUMENTS

WO 9721297 A1 6/1997

OTHER PUBLICATIONS

Technology White Paper "Rich Presence: A New User Communications Experience" 8 pages, copyrighted 1st quarter 2005.
J. Rosenberg "A Data model for Presence", draft-ietf-simple-data-model-05, Sep. 22, 2005, pp. 1-35.
J. Rosenberg "A Presence Event Package for the Session Initiation Protocol (SIP)", RFC 3856, Aug. 2004, pp. 1-28.
H. Shulzerine et al RPID: Rich Presence Extensions to the Presence Information Data Format (PIDF), draft-ietf-simple-rpid-08, Jul. 16, 2005, pp. 1-41.
J. Rosenberg "Presence Authorization Rules", draft-ietf-simple-presence-rules-03, Jul. 18, 2005, pp. 1-27.
PCT Search Report for PCT Patent Application No. PCT/US2008/067182 dated Oct. 6, 2008.

* cited by examiner

*Primary Examiner* — Gerald Gauthier
(74) *Attorney, Agent, or Firm* — Capitol Patent & Trademark Law Firm, PLLC

(57) ABSTRACT

A voice communication controller (e.g., private branch exchange (PBX)) is described herein which can automatically enable an outbound dual tone multi-frequency (DTMF) feature for one of it's extensions that is attached to a phone which belongs to a user while that user is or is likely to be participating in a session with an external DTMF communication system (e.g., a conference/collaboration bridge, an interactive voice response (IVR) system, or a voice mail system). This is desirable because if the user presses button(s) on their phone then the voice communication controller which has enabled the outbound DTMF feature will not attempt to process the corresponding DTMF digit(s) but instead will automatically transfer the corresponding DTMF signal(s) to the external DTMF communication system.

11 Claims, 2 Drawing Sheets

PRESENCE BASED DTMF SIGNALING ENABLEMENT OF VOICE COMMUNICATION CONTROLLER AND METHOD

TECHNICAL FIELD

The present invention is related to a voice communication controller (e.g., private branch exchange (PBX)) which can automatically enable an outbound dual tone multi-frequency (DTMF) feature for one of it's extensions that is attached to a phone which belongs to a user while that user is or is likely to be participating in a session with an external DTMF communication system (e.g., a conference/collaboration bridge, an interactive voice response (IVR) system, or a voice mail system).

BACKGROUND

A private branch exchange (PBX) typically has features like "place a second call", "transfer" or "conference" that are initiated by a user when they press one or more buttons on their phone. For instance, the user can press *55 (DTMF signaling) on their phone (e.g., regular phone) to have the PBX initiate a "transfer". Or, the user can use their phone (e.g., high-end phone) and press a hard (or programmable soft) button which is specifically associated with a particular feature like "transfer" and have this operation performed by the PBX. In the last case, the user can press the hard (or programmable soft) button on their phone (e.g., high-end phone) and does not need to remember the specific DTMF number (feature code) to have the PBX initiate the "transfer" feature.

This set-up works relatively well in most situations except for when the user calls an interactive voice recognition (IVR) system (for example) like one which can be used by a bank that typically asks the user to press one or more buttons on their phone in response to a question like do you speak Spanish or please enter your bank account number. Since, the PBX is typically listening for feature codes via DTMF signals it interprets these DTMF signals (pressed buttons) to be for the PBX's own use and as a result will not transfer the DTMF signals to the IVR system. This is not desirable because the person will not be able to communicate with and/or retrieve the desired information from the IVR system.

In an attempt to address this problem, the PBX has been programmed such that it can enable an "outbound DTMF feature". In this case, if the user pressed *22 (for example) on their phone or if they pressed a specific hard (or programmable soft) button on their phone or if they performed a "hook flash" (briefly hang-up the phone) then the PBX would enable the "outbound DTMF feature" which would allow subsequent DTMF signals to pass to the remote IVR system (or other type of DTMF communication system like a conference/collaboration bridge or a voice mail system). However, this solution is awkward since the person may not realize that they need to enable the "outbound DTMF feature" in the first place or they may have difficulty recalling the particular DTMF signaling or the "hook flash" operation that they need to perform to enable the "outbound DTMF feature".

One attempt to address this particular problem involved programming the PBX such that the "outbound DTMF feature" was always enabled. However, this default setting of the PBX was not desirable because the person could no longer use keypad presses or DTMF signaling to control the PBX. Accordingly, there is still a need to solve the problem associated with properly enabling the PBX's "outbound DTMF feature". This need and other needs are satisfied by the voice communication controller (e.g., PBX), the method and the presence system of the present invention.

SUMMARY

In one aspect, the present invention provides a voice communication controller (e.g., PBX) which has a processor that obtains information indicating a user of a communication device is participating in a session with an external DTMF communication system and then enables an outbound DTMF feature for an extension associated with the communication unit such that if the user presses button(s) on the communication unit then the corresponding DTMF signal(s) will be passed on to the external DTMF communication system.

In yet another aspect, the present invention provides a method for enabling a voice communication controller (e.g., PBX) to automatically enable an outbound DTMF feature by following these steps: (a) obtaining information indicating that a person is likely using a communication unit which is connected to an extension within the PBX to participate in a session with an external DTMF communication system; and (b) enabling the outbound DTMF feature for the extension associated with the communication unit such that if the person presses button(s) on the communication unit then the voice communication controller transfers the corresponding DTMF signal(s) to the external DTMF communication system.

In still yet another aspect, the present invention provides a presence system comprising a presence server and a rules engine. The presence server collects presence information about a person. The rules engine aggregates the presence information and analyzes the aggregated presence information to determine if a connected-to-DTMF-configured-system presence state should be set which would be set if the person is likely using a communication unit to participate in a session with an external DTMF communication system. The presence server would publishes the set connected-to-DTMF-configured-system presence state to a voice communication controller (e.g., PBX) which then enables an outbound DTMF feature for an extension associated with the communication unit such that if the person presses button(s) on the communication unit then the voice communication controller transfers the corresponding DTMF signal(s) to the external DTMF communication system.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
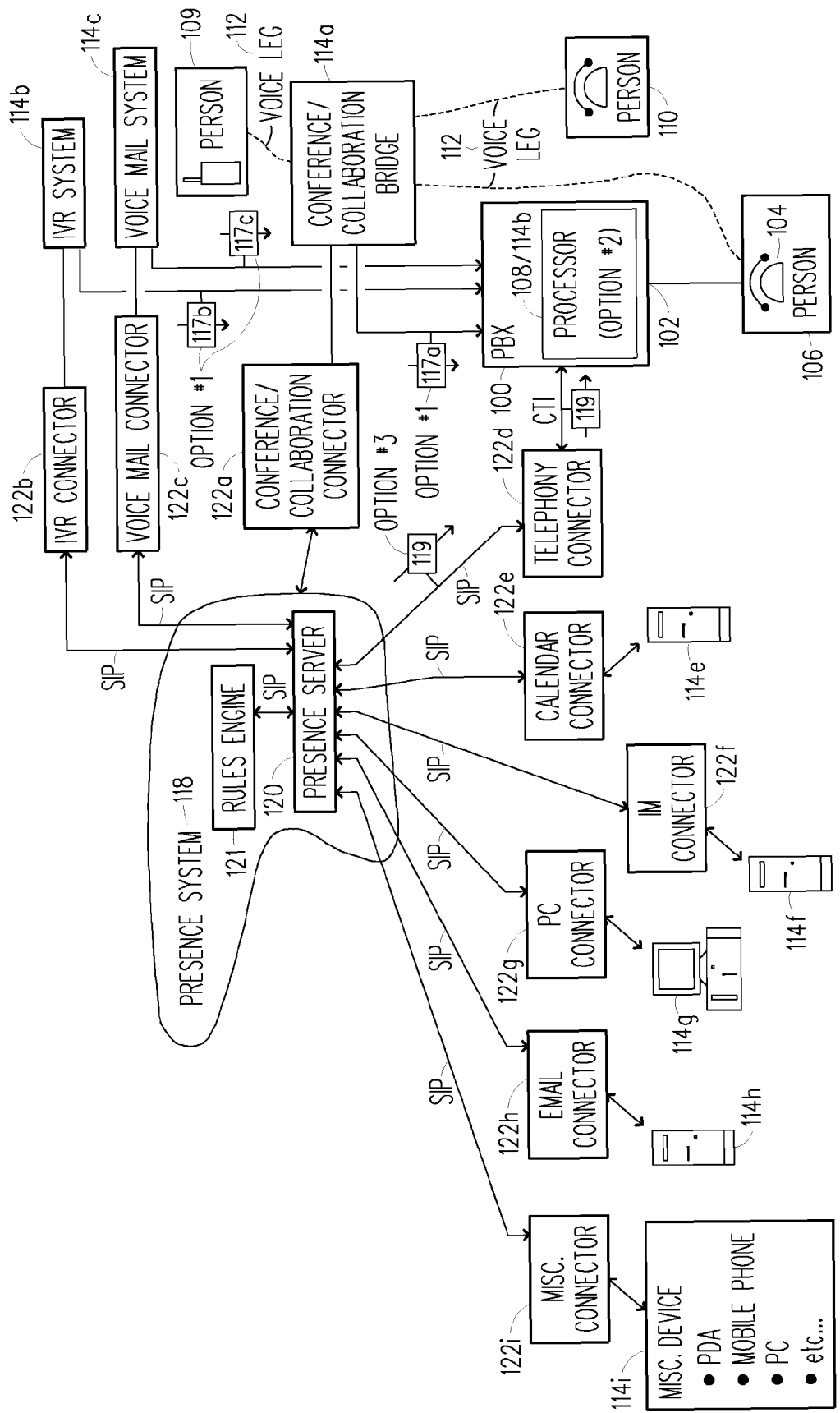
FIG. 1 is a block diagram that is used to help explain several different ways a PBX can obtain information so it knows when to automatically enable an outbound DTMF feature for a particular user in accordance with the present invention.

Referring to FIG. 1, there is illustrated a diagram which is used to help describe several different ways a PBX 100 can obtain information so it knows when to automatically enable an outbound DTMF feature for one of it's extensions 102 that is attached to a phone 104 which belongs to a user 106 that is or is likely to be participating in a session with an external DTMF communication system 114a, 114b and 114c (e.g., a conference/collaboration bridge 114a, an IVR system 114b, or a voice mail system 114c). Although a PBX 100 is used herein to describe the present invention, it should be appreciated that many other types of voice communication controllers (which can be implemented in software, hardware or a combination of software and hardware) could also be used including, for example, an IP-PBX (which supports IP phones), a hybrid PBX-IP-PBX (which supports analog phones, Time Division Multiplexing (TDM) phones and IP phones), or a software-server voice communication controller implementation.

Basically, the PBX 100 needs to obtain information that the person 106 is or is likely to be participating in a session with an external DTMF communication system 114a, 114b or 114c (e.g., the conference/collaboration bridge 114a, the IVR system 114b, or the voice mail system 114c) before it can enable an outbound DTMF feature for the extension 102 connected to the person's device 104 (e.g., office phone 104). The PBX 100 (in particular the processor 108) can obtain this information in different ways (see options 1, 2 and 3) so it can then automatically enable the outbound DTMF feature such that when the user 106 presses button(s) on their phone 104 then the PBX 100 will not attempt to process the corresponding DTMF signal(s) but instead will transfer the corresponding DTMF signal(s) to the desired external DTMF communication system 114a, 114b or 114c. It should be noted that if the person 106 does not call an external DTMF communication system 114a, 114b or 114c then the PBX 100 would not enable the outbound DTMF feature and would instead process any incoming DTMF signals to initiate a desired PBX feature.

In option #1, the PBX 100 can obtain this information directly from the DTMF communication system 114a, 114b and 114c. For instance, the PBX 100 can receive this information 117a directly from the conference/collaboration bridge 114a which indicates person 106 is going to participate with several other people 109 and 110 (only two shown) in a multi-party conference call (shown as voice legs 112) (note: the user 106 may need to use DTMF signaling to set-up or become part of the multi-party conference hosted by the conference/collaboration bridge 114a hence the benefit of implementing the present invention). The conference/collaboration bridge 114a determines this information 117a by analyzing a phone number of a called/calling party that may be participating in a multi-party conference call and mapping that phone number to the communication device 104 used by person 106. If desired, the conference/collaboration bridge 114a can use Voice Over Internet Protocol (VoIP) signaling, tones, or in-band signaling to transmit the information 117a to the PBX 100. Upon receiving this information 117a, the PBX 100 (in particular the processor 108) then enables the outbound DTMF feature for the extension 102 associated with the person's device 104.

Alternatively, the PBX 100 can receive this information 117b directly from the IVR system 114b (like one commonly used by a financial institution, a movie theaters etc. . . . ) which indicates person 106 is attempting to communicate with and retrieve information from the IVR system 114b. The IVR system 114b determines this information 117b by analyzing a phone number of a calling party and mapping that phone number to the communication device 104 used by person 106. If desired, the IVR system 114b can use VOIP signaling, tones, or in-band signaling to transmit the information 117b to the PBX 100. Upon receiving this information 117b, the PBX 100 (in particular the processor 108) enables the outbound DTMF feature for the extension 102 associated with the person's device 104.

In yet another alternative, the PBX 100 can receive this information 117c directly from the voice mail system 114c which indicates person 106 has called the voice mail system 114c to retrieve voice/text mails from their mail box. The voice mail system 114c determines this information 117c by analyzing a phone number of a calling party and mapping that phone number to the communication device 104 used by person 106. If desired, the voice mail system 114c can use VoIP signaling, tones, or in-band signaling to transmit the information 117c to the PBX 100. Upon receiving this information 117c, the PBX 100 (in particular the processor 108) enables the outbound DTMF feature for the extension 102 associated with the person's device 104.

In option #2, the PBX 100 determines by itself that person 106 is likely to be participating in a session (e.g., multi-party conference) with an external DTMF communication system 114a, 114b or 114c (e.g., conference/collaboration bridge 114a). In this case, the PBX 100 infers that person 106 is likely to be participating in the session by analyzing either a phone number called by person 106 or a phone number associated with an incoming call to the person 106 and determining that this particular phone number is associated with an external DTMF communication system 114a, 114b or 114c (e.g., conference/collaboration bridge 114a). The PBX 100 (in particular the processor 108) then enables the outbound DTMF feature for the extension 102 associated with the person's device 104.

In option #3, the PBX 100 obtains this information in the form of a connected-to-DTMF-configured-system presence state 119 (e.g., connected-to-conference/collaboration-bridge presence state, connected-to-interactive-voice-response-system presence state or connected-to-voice-mail-system presence state) from a presence system 118. In this case, the presence system 118 collects real-time information about the activities of person 106 and if the collected information indicates that person 106 is likely participating in a session with an external DTMF communication system 114a, 114b or 114c then it sets and publishes the connected-to-DTMF-configured-system presence state 119. In this embodiment, the PBX 100 needs to subscribe with the presence system 118 to be a watcher of person 106 so it can obtain published presence information about person 106 which includes at least the connected-to-DTMF-configured-system presence state 119. There are many different ways the presence system 118 can collect real-time information about person 106 and then determine/infer that person 106 is participating in a session with an external DTMF communication system 114a, 114b or 114c. Several examples about how this can be accomplished are described below after a brief discussion is provided about the basic structure/function of the presence system 118.

As shown, the presence system 118 includes a presence server 120 which is connected to a rules engine 121. Alternatively, the presence server 120 could be co-located with the rules engine 121. In either case, the presence server 120 is coupled via multiple Session Initiation Protocol (SIP) interfaces (or SIP for Instant Messaging (SIMPLE) interfaces, Extensible Messaging and Presence Protocol (XMPP) interfaces etc.) to various connectors 122a, 122b . . . 122i which in turn are respectively coupled to various devices 114a, 114b . . . 114i. In this example, the connectors 122 include a conference/collaboration connector 122a, an IVR connector 122b, a voice mail connector 122c, a telephony connector 122d, a calendar connector 122e, an IM connector 122f, a PC connector 122g, an email connector 122h and a miscellaneous connector 122i. And, the devices 114 include the conference/collaboration bridge 114a, the IVR system 114b, the voice mail system 114c, the processor 108/114d (shown located in PBX 100), a calendar server 114e, an IM server 114f, a PC 114g, an email server 114h and a miscellaneous device 114i (e.g., personal digital assistant (PDA), mobilephone, PC). For clarity, the description provided herein about the presence system 118, the various connectors 122a, 122b . . . 122i, and the various devices 114a, 114b . . . 114i omits those details that are well known in the industry and are not needed to understand the present invention.

The presence server 120 collects a wide-variety of information about the real-time activities of person 106 and then the rules engine 121 aggregates and analyzes this presence information in view of preference rules/policies and if appropriate sets the connected-to-DTMF-configured-system presence state 119. Then, the presence server 120 publishes the connected-to-DTMF-configured-system presence state 119 so it can be received by the PBX 100. As a result, the PBX 100 knows that person 106 is likely to be participating in a session with an external DTMF communication system 114a, 114b or 114c and can then enable the outbound DTMF feature for the extension 102 associated with the person's device 104. Several different examples are provided next to indicate how the presence server 120 and rules engine 121 can determine when to set the connected-to-DTMF-configured-system presence state 119.

In the first example, the presence server 120 interfaces with the IVR connector 122b and obtains presence information via the IVR system 114b which indicates a phone number of a calling party that is attempting to communicate with and retrieve information from the IVR system 114b. The rules engine 121 analyzes this presence information (in view of other information) and determines that the phone number of the calling party is associated with the communication device 104 that is used by person 106. The rules engine 121 then infers that person 106 is participating in a session with the IVR system 114b and sets the connected-to-interactive-voice-response-system presence state 119 (which is one type of the more generic connected-to-DTMF-configured-system presence state 119). The presence server 120 publishes the connected-to-interactive-voice-response-system presence state 119. And, the PBX 100 after receiving the published connected-to-interactive-voice-response-system presence state 119 then enables the outbound DTMF feature for the extension 102 associated with the person's device 104.

In the second example, the presence server 120 interfaces with the voice mail connector 122c and obtains presence information via the voice mail system 114c which indicates a phone number of a calling party that called the voice mail system 114c to retrieve voice/text mails from their mail box. The rules engine 121 analyzes this presence information (in view of other information) and determines that the phone number of the calling party is associated with the communication device 104 that is used by person 106. The rules engine 121 then infers that person 106 is participating in a session with the voice mail system 114c and sets the connected-to-voice-mail-system presence state 119 (which is one type of the more generic connected-to-DTMF-configured-system presence state 119). The presence server 120 publishes the connected-to-voice-mail-system presence state 119. And, the PBX 100 after receiving the published connected-to-voice-mail-system presence state 119 then enables the outbound DTMF feature for the extension 102 associated with the person's device 104.

In the third example, the presence server 120 interfaces with the conference/collaboration connector 122a and obtains presence information via the conference/collaboration bridge 114a which indicates a phone number of a calling party (or a called party) that called (or was called by) the external conference/collaboration bridge 114a to participate in a multi-party conference call. The rules engine 121 analyzes this presence information (in view of other information) and determines that the phone number of the calling party (or called party) is associated with the communication device 104 that is used by person 106. The rules engine 121 then infers that person 106 is participating in a multi-party conference call hosted by the external conference/collaboration bridge 114a and sets the in-a-conference presence state 119 (which is one type of the more generic connected-to-DTMF-configured-system presence state 119). The presence server 120 publishes the in-a-conference presence state 119. And, the PBX 100 after receiving the published in-a-conference presence state 119 then enables the outbound DTMF feature for the extension 102 associated with the person's device 104.

Following are several other exemplary cases where the presence system 118 can receive presence information and infer that person 106 is participating in a session with the external conference/collaboration bridge 114a (or other DTMF communication system 114b and 114c) and then as a result publish the set in-a-conference presence state 119 (or the connected-to-DTMF-configured-system presence state 119). Then, the PBX 100 after receiving the published in-a-conference presence state 119 (or the connected-to-DTMF-configured-system presence state 119) then enables the outbound DTMF feature for the extension 102 associated with the person's device 104.

In one case, the presence server 120 interfaces with the telephony connector 122d and obtains presence information via the PBX 100 which indicates that person 106 used communication device 104 to call a particular phone number or to receive a call from a particular phone number. The rules engine 121 analyzes this presence information (in view of other information) and determines that this particular phone number is associated with the external conference/collaboration bridge 114a (or the other DTMF communication system 114b and 114c). The rules engine 121 then infers that person 106 is participating in a session with the external conference/collaboration bridge 114a (or the other DTMF communication system 114b and 114c) and sets the in-a-conference presence state 119 (or the connected-to-DTMF-configured-system presence state 119). The presence server 120 publishes the in-a-conference presence state 119 (or the connected-to-DTMF-configured-system presence state 119). And, the PBX 100 after receiving the published in-a-conference presence state 119 (or the connected-to-DTMF-configured-system presence state 119) then enables the outbound DTMF feature for the extension 102 associated with the person's device 104.

In a second case, the presence server 120 interfaces with the calendar connector 122e and obtains presence information via the calendar server 114e which indicates that person 106 is scheduled at a particular time to participate in a multi-party conference call. The rules engine 121 analyzes this presence information (in view of other information) and sets the in-a-conference presence state 119 when the multi-party conference call is scheduled to take place. The presence server 120 publishes the in-a-conference presence state 119. And, the PBX 100 after receiving the published in-a-conference presence state 119 then enables the outbound DTMF feature for the extension 102 associated with the person's device 104.

In a third case, the presence server 120 interfaces with the IM connector 122*f* and obtains presence information via the IM server 114*f* which indicates that person 106 has manually set the in-a-conference presence state 119 (or the connected-to-DTMF-configured-system presence state 119). The presence server 120 publishes the in-a-conference presence state 119 (or the connected-to-DTMF-configured-system presence state 119). And, the PBX 100 after receiving the published in-a-conference presence state 119 (or the connected-to-DTMF-configured-system presence state 119) then enables the outbound DTMF feature for the extension 102 associated with the person's device 104.

In a fourth case, the presence server 120 interfaces with the PC connector 122*g* and obtains presence information via the PC 114*g* which indicates that person 106 has used a GUI in their PC 114*g* to call a particular phone number. The rules engine 121 analyzes this presence information (in view of other information) and determines that this particular phone number is associated with the external conference/collaboration bridge 114*a* (or other DTMF communication system 114*b* and 114*c*). The rules engine 121 then infers that person 106 is participating in a session with the external conference/collaboration bridge 114*a* (or other DTMF communication system 114*b* and 114*c*) and sets the in-a-conference presence state 119 (or the connected-to-DTMF-configured-system presence state 119). The presence server 120 publishes the in-a-conference presence state 119 (or the connected-to-DTMF-configured-system presence state 119). And, the PBX 100 after receiving the published in-a-conference presence state 119 (or the connected-to-DTMF-configured-system presence state 119) then enables the outbound DTMF feature for the extension 102 associated with the person's device 104.

In a fifth case, the presence server 120 interfaces with the email connector 122*h* to obtain presence information via the email server 114*h* which indicates that person 106 has received and/or sent an email indicating that they are scheduled at a particular time to participate in a multi-party conference call. The rules engine 121 analyzes this presence information (in view of other information) and sets the in-a-conference presence state 119 when the multi-party conference call is scheduled to take place. The presence server 120 then publishes the in-a-conference presence state 119. And, the PBX 100 after receiving the published in-a-conference presence state 119 then enables the outbound DTMF feature for the extension 102 associated with the person's device 104.

In a sixth case, the presence server 120 interfaces with the miscellaneous connector 122*i* and obtains presence information via a miscellaneous device 114*i* (e.g., PDA, mobile phone, PC). The presence information can indicate that person 106 has used a GUI, a keyboard, a keypad, a pointer, a mouse etc. . . . to manually set the in-a-conference presence state 119 (or the connected-to-DTMF-configured-system presence state 119). The presence server 120 publishes the in-a-conference presence state 119 (or the connected-to-DTMF-configured-system presence state 119). And, the PBX 100 after receiving the published in-a-conference presence state 119 (or the connected-to-DTMF-configured-system presence state 119) then enables the outbound DTMF feature for the extension 102 associated with the person's device 104.

As can be seen, the presence server 120 can collect a wide variety of presence information about the real-time activities of person 106 and then the rules engine 121 can analyze that information and determine/infer that person 106 is likely participating in a session with a DTMF communication system 114*a*, 114*b* or 114*c*. Of course, it should be appreciated that the presence server 120 can also collect other types of presence information which were not mentioned above but could be used by the rules engine 121 to determine/infer that person 106 is likely participating in a session with a DTMF communication system 114*a*, 114*b* or 114*c*.

Figure 2:
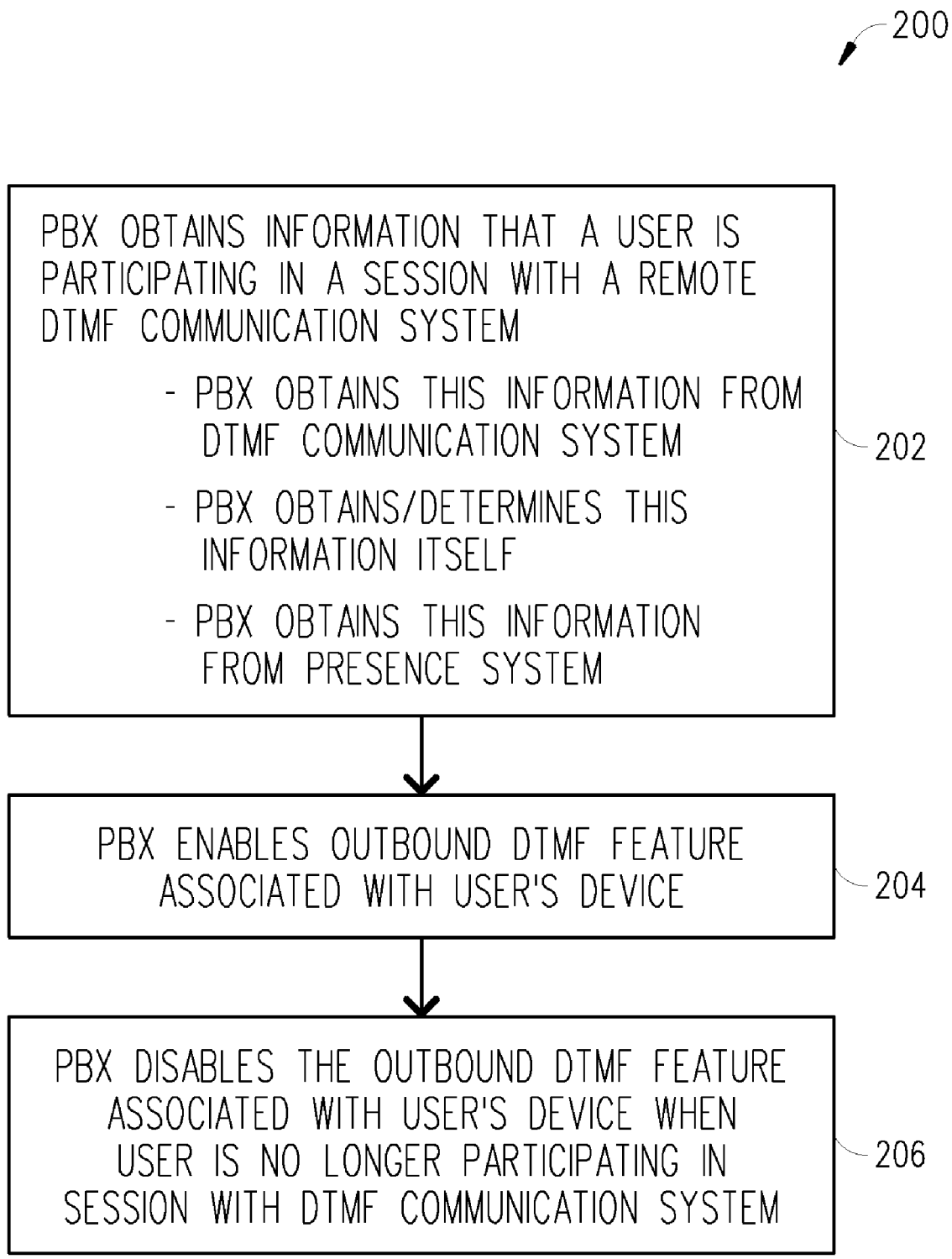
FIG. 2 is a flowchart that illustrates the basic steps of a method for enabling a PBX to automatically enable an outbound DTMF feature for a particular user in accordance with the present invention.

Referring to FIG. 2, there is a flowchart of the basic steps of the method 200 for enabling a PBX 100 to automatically enable an outbound DTMF feature for a user 106 when they are likely to be participating in a session with a DTMF communication system 114*a*, 114*b* or 114*c* in accordance with the present invention. Beginning at step 202, the PBX 100 (in particular the processor 108) obtains information that person 106 is using a communication device 104 (e.g., office phone 104) connected to the PBX's extension 102 so they can take part in a session with the external DTMF communication system 114*a*, 114*b* or 114*c* (e.g., a conference/collaboration bridge 114*a*, an IVR system 114*b*, or a voice mail system 114*c*). As discussed above, the PBX 100 can obtain this information 117*a*, 117*b* or 117*c* directly from the DTMF communication system 114*a*, 114*b* or 114*c* (see option #1). In addition, the PBX 100 can determine by itself that person 106 is participating in a session with a DTMF communication system 114*a*, 114*b* or 114*c* (see option #2). Moreover, the PBX 100 can obtain this information 119 (e.g., the connected-to-DTMF-configured-system presence state 119) directly from the presence system 118 (see option #3). At step 204, the PBX 100 (in particular the processor 108) after obtaining this information 117*a*, 117*b*, 117*c* or 119 enables the outbound DTMF feature for the extension 102 which is associated with the communication device 104 that is in use or is commonly used by person 106. At this time, if the user 106 presses button(s) on their phone 104 then the PBX 100 which has enabled the outbound DTMF feature will not attempt to process the corresponding DTMF signal(s) but instead will automatically transfer the corresponding DTMF signal(s) to the external DTMF communication system 114*a*, 114*b* or 114*c*. At step 206, the PBX 100 (in particular the processor 108) disables the outbound DTMF feature for extension 102 which is associated with the communication device 104 after a predetermined amount of time has passed, after the communication device 104 is placed "on-hook" or when it is determined that person 106 is no longer participating in the session with the DTMF communication system 114*a*, 114*b* or 114*c*.

Following are some additional features, advantages and uses of the present invention:

- The PBX 100, the presence system 118 and the method 200 can support and monitor any number of people even though only one person 106 is shown and described herein.
- The PBX 100 can obtain other types of presence information from the presence system 118 in addition to the connected-to-DTMF-configured-system presence state 119. Plus, the presence system 118 may have rules/policies that are used to decide which presence information should be sent to the PBX 100.
- Even though person 106 has been described in several examples herein as participating in a multi-party conference call. It should be understood that the present invention could also be used if person 106 happens to be participating in a collaboration session.
- The present invention can be related and coupled with another invention discussed in the following documents:

U.S. Patent Application Publication No. 2007/0081644 A1 entitled "Telephony/Conference Activity Presence State".

U.S. Patent Application Publication No. 2007/0117508 A1 entitled "Conference Presence Based Music-On-Hold Suppression System and Method".

U.S. Patent Application Publication No. 2007/0133437 A1 entitled "System and Methods for using Data about who is speaking in a Communications Conference to Enhance Business use of Temporal Identification of Those Participating and of Communications Conference Archives".

The contents of these documents are hereby incorporated by reference herein.

For a more detailed discussion about the basics of the presence system 118, reference is made to the following documents:

Jack Jachner et al. "Rich Presence: A New User Communications Experience" Technology White Paper, 8 pages, copyrighted 1st quarter 2005.

J. Rosenberg, "A Data Model for presence", draft-ietf-simple-data-model-05 (work in progress), Sep. 22, 2005.

Rosenberg, J. "A presence Event package for the Session initiation protocol (SIP)", RFC 3856, August 2004.

H. Shulzerine et al. "RPID: Rich Presence Extensions to the presence Information Data Format (PIDF)", draft-ietf-simple-rpid-08, (work in progress), Jul. 16, 2005.

Rosenberg, J. "Presence Authorization Rules", draft-ietf-simple-presence-rules-03(work in progress), Jul. 20, 2005.

The contents of these documents are incorporated by reference herein.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

The invention claimed is:

1. A presence system comprising:
a presence server for collecting presence information about a person;
a rules engine for aggregating the presence information and analyzing the aggregated presence information to determine if a connected-to-DTMF-configured-system presence state should be set which would be set if the person is likely using a communication unit to participate in a session with an external dual tone multi-frequency (DTMF) communication system; and
said presence server publishes the set connected-to-DTMF-configured-system presence state to a voice communication controller which then enables an outbound DTMF feature for an extension associated with the communication unit such that if the person presses button(s) on the communication unit then the voice communication controller transfers corresponding DTMF signal(s) to the external DTMF communication system.

2. The presence system of claim 1, wherein said DTMF communication system includes:
a conference/collaboration bridge;
an interactive voice response system; or
a voice mail system.

3. The presence system of claim 1, wherein said connected-to-DTMF-configured-system presence state further includes anyone of the following:
a connected-to-conference/collaboration-bridge presence state;
a connected-to-interactive-voice-response-system presence state; and
a connected-to-voice-mail-system presence state.

4. The presence system of claim 1, wherein said presence server interfaces with a connector associated with the external DTMF communication system to obtain presence information which indicates a phone number of a party that called or was called by the external DTMF communication system; and
said rules engine determines that the phone number is associated with the communication unit used by the person and then infers that the person is participating in the session with the external DTMF communication system and sets the connected-to-DTMF-configured-system presence state.

5. The presence system of claim 1, wherein:
said presence server interfaces with a telephony connector to obtain presence information indicating that the person used the communication device to call or receive a call from a particular phone number; and
said rules engine determines that the particular phone number is associated with the external DTMF communication system and then infers that the person is participating in the session with the external DTMF communication system and sets the connected-to-DTMF-configured-system presence state.

6. The presence system of claim 1, wherein:
said presence server interfaces with a calendar connector to obtain presence information which indicates the person is scheduled at a particular time to participate in the session with the external DTMF communication system; and
said rules engine determines that this is the particular time in which the session is scheduled to take place and then infers that the person is participating in the session and sets the connected-to-DTMF-configured-system presence state.

7. The presence system of claim 1, wherein:
said presence server interfaces with an Instant Message connector to obtain presence information which indicates that the person has manually set the connected-to-DTMF-configured-system presence state.

8. The presence system of claim 1, wherein:
said presence server interfaces with an personal computer connector to obtain presence information which indicates that the person has used a graphical user interface to call a particular phone number; and
said rules engine determines that the particular phone number is associated with the external DTMF communication system and then infers that the person is participating in the session with the external DTMF communication system and sets the connected-to-DTMF-configured-system presence state.

9. The presence system of claim 1, wherein:
said presence server interfaces with an email connector to obtain presence information which indicates that the person has received and/or sent an email indicating that they are scheduled at a particular time to participate in the session with the external DTMF communication system; and
said rules engine determines that this is the particular time in which the session is scheduled to take place and then infers that the person is participating in the session with the external DTMF communication system and sets the connected-to-DTMF-configured-system presence state.

10. The presence system of claim 1, wherein:

said presence server interfaces with a connector associated with a personal computer, personal digital assistant or a mobile phone to obtain presence information which indicates that the person has used a graphical user interface, a keyboard, a keypad, a pointer or a mouse to manually set the connected-to-DTMF-configured-system presence state.

11. The presence system of claim 1, wherein said voice communication controller is a private branch exchange (PBX), an internet-protocol private branch exchange (IP-PBX), a hybrid PBX-IP-PBX, or a software server.

\* \* \* \* \*